(12) United States Patent
Furseth et al.

(10) Patent No.: US 8,997,933 B2
(45) Date of Patent: Apr. 7, 2015

(54) LOAD-BEARING PLATFORM

(75) Inventors: Michael R. Furseth, Cumberland, WI (US); Randy L. Schamberger, Cumberland, WI (US); Benjamin T. Nelson, Cameron, WI (US); Brendan Lonergan, Cumberland, WI (US)

(73) Assignee: Ardisam, Inc., Cumberland, WI (US)

( * ) Notice: Subject to any disclaimer, the term of this patent is extended or adjusted under 35 U.S.C. 154(b) by 249 days.

(21) Appl. No.: 13/293,960

(22) Filed: Nov. 10, 2011

(65) Prior Publication Data

US 2012/0080269 A1 Apr. 5, 2012

Related U.S. Application Data

(63) Continuation-in-part of application No. 13/252,876, filed on Oct. 4, 2011.

(60) Provisional application No. 61/389,539, filed on Oct. 4, 2010.

(51) Int. Cl.
*A01M 31/02* (2006.01)
*B22D 17/22* (2006.01)

(52) U.S. Cl.
CPC ............. *B22D 17/22* (2013.01); *A01M 31/02* (2013.01)

(58) Field of Classification Search
USPC ............... 52/630, 793.1, 660, 664; 108/152; 182/187, 188, 135, 136, 222, 223; 428/116, 167; 264/630
See application file for complete search history.

(56) References Cited

U.S. PATENT DOCUMENTS

| | | | |
|---|---|---|---|
| 3,220,766 A | 11/1965 | Kates | |
| 3,279,134 A * | 10/1966 | William | 52/126.6 |
| 3,358,789 A | 12/1967 | Laun | |
| 3,419,108 A | 12/1968 | Mobbs | |
| 4,022,292 A | 5/1977 | Van Gompel | |
| 4,134,474 A | 1/1979 | Stavenau et al. | |
| 4,257,490 A | 3/1981 | Bandy | |
| 4,490,958 A * | 1/1985 | Lowe | 52/634 |
| 4,539,455 A * | 9/1985 | Colato et al. | 219/732 |
| 4,549,635 A | 10/1985 | Early | |
| 4,552,247 A | 11/1985 | Purdy | |
| 4,579,198 A * | 4/1986 | Lee | 182/115 |
| 4,601,364 A * | 7/1986 | York | 182/187 |
| 4,661,245 A * | 4/1987 | Rutherford et al. | 209/399 |

(Continued)

OTHER PUBLICATIONS

Definition of 'tree' can be found in Action Random House Kernerman Webster's College Dictionary, © 2010 K Dictionaries Ltd. Copyright 2005, 1997, 1991 by Random House, Inc. All rights reserved.*

(Continued)

*Primary Examiner* — Daniel Cahn
(74) *Attorney, Agent, or Firm* — Stoel Rives LLP

(57) ABSTRACT

Tree stands are disclosed for providing an elevated standing location. The tree stand can include a support post, a seat rotatably coupled to the first end of the support post, and a platform rotatably coupled to the second end of the support post. The platform can comprise a plurality interconnected polygonal shapes defining a top standing surface. The platform can be a grating that has load bearing properties and that can be cast from a mold. The platform includes a perimeter wall, a surface portion, and one or more reinforcement walls. A height or thickness of the surface portion is less than a height or thickness of the perimeter wall and/or the reinforcement walls.

15 Claims, 12 Drawing Sheets

(56) References Cited

U.S. PATENT DOCUMENTS

| | | | |
|---|---|---|---|
| 4,742,888 A | 5/1988 | Amacker | |
| 4,784,239 A | 11/1988 | Kirkman | |
| 4,901,490 A * | 2/1990 | Zinniel et al. | 52/263 |
| 4,905,792 A | 3/1990 | Wilson | |
| 4,909,660 A * | 3/1990 | Ferns | 404/2 |
| 4,945,858 A * | 8/1990 | Myers et al. | 119/526 |
| 4,951,696 A | 8/1990 | Jones, Sr. | |
| 4,977,793 A * | 12/1990 | Husted | 74/567 |
| 5,009,283 A * | 4/1991 | Prejean | 182/116 |
| 5,060,756 A * | 10/1991 | D'Acquisto | 182/187 |
| 5,064,020 A | 11/1991 | Eagleson | |
| 5,079,884 A * | 1/1992 | Menchetti | 52/241 |
| 5,105,908 A * | 4/1992 | Freund | 182/20 |
| 5,117,942 A | 6/1992 | Tzavaras | |
| D329,501 S | 9/1992 | Friesenhahn | |
| 5,275,257 A * | 1/1994 | Robertson | 182/116 |
| 5,310,019 A * | 5/1994 | Paul | 182/187 |
| 5,339,922 A * | 8/1994 | Beechler | 182/188 |
| 5,477,654 A * | 12/1995 | Weelink | 52/664 |
| 5,480,729 A * | 1/1996 | Hattori et al. | 428/593 |
| 5,527,585 A * | 6/1996 | Needham et al. | 428/156 |
| 5,558,179 A * | 9/1996 | Matthews | 182/222 |
| 5,564,524 A | 10/1996 | Thaggard et al. | |
| 5,776,582 A * | 7/1998 | Needham | 428/116 |
| 5,791,436 A * | 8/1998 | Talley, Sr. | 182/116 |
| 5,842,540 A | 12/1998 | Mancini, Jr. | |
| 5,881,839 A | 3/1999 | Stanley | |
| 5,927,435 A | 7/1999 | Benton | |
| 5,927,437 A | 7/1999 | Fast | |
| 5,979,603 A * | 11/1999 | Woller | 182/187 |
| 5,992,112 A * | 11/1999 | Josey | 52/309.8 |
| 5,996,738 A | 12/1999 | Nelsen | |
| 6,035,966 A * | 3/2000 | Lewis | 182/7 |
| 6,119,428 A * | 9/2000 | Gumz | 52/660 |
| 6,120,712 A * | 9/2000 | Chase | 264/40.5 |
| 6,145,619 A | 11/2000 | Risser | |
| 6,170,216 B1 * | 1/2001 | Rye et al. | 52/660 |
| 6,199,660 B1 | 3/2001 | Meeks | |
| D445,201 S * | 7/2001 | D'Acquisto | D25/62 |
| D452,331 S | 12/2001 | Bohlman | |
| 6,455,131 B2 * | 9/2002 | Lopez-Anido et al. | 428/178 |
| 6,505,707 B1 | 1/2003 | Berry | |
| 6,513,292 B2 * | 2/2003 | Kumon | 52/309.9 |
| 6,519,902 B1 * | 2/2003 | Scissom | 52/126.4 |
| 6,520,291 B2 | 2/2003 | Andrey | |
| 6,568,505 B1 * | 5/2003 | D'Acquisto | 182/187 |
| 6,622,823 B2 | 9/2003 | Engstrom | |
| 6,684,812 B1 * | 2/2004 | Tucker | 119/57.91 |
| 6,725,972 B1 | 4/2004 | Krier et al. | |
| 6,817,446 B1 * | 11/2004 | Bisland | 182/187 |
| 6,883,644 B1 * | 4/2005 | Braun et al. | 182/187 |
| 6,942,065 B1 | 9/2005 | Price | |
| 6,948,587 B2 | 9/2005 | Griffiths | |
| 7,021,423 B1 * | 4/2006 | Pestrue et al. | 182/116 |
| 7,090,083 B2 * | 8/2006 | Russell et al. | 209/405 |
| 7,174,688 B2 * | 2/2007 | Higginbotham | 52/672 |
| RE39,725 E * | 7/2007 | Muhich | 182/187 |
| 7,246,683 B2 * | 7/2007 | Pringnitz | 182/187 |
| 7,360,343 B1 * | 4/2008 | Spransy et al. | 52/263 |
| 7,850,010 B2 * | 12/2010 | Takev | 209/393 |
| D645,571 S * | 9/2011 | Furseth et al. | D25/62 |
| 8,113,357 B2 * | 2/2012 | Johnson et al. | 209/397 |
| 8,231,010 B2 * | 7/2012 | Scott et al. | 209/397 |
| 8,424,645 B2 * | 4/2013 | Schlipf | 182/230 |
| 2002/0112919 A1 | 8/2002 | Graham, Jr. | |
| 2004/0065043 A1 * | 4/2004 | Foderberg et al. | 52/630 |
| 2004/0084248 A1 | 5/2004 | Burgeson | |
| 2004/0159006 A1 * | 8/2004 | Griese et al. | 34/444 |
| 2004/0216953 A1 | 11/2004 | Cheeks | |
| 2005/0236547 A1 * | 10/2005 | Henning | 248/346.02 |
| 2006/0054397 A1 * | 3/2006 | Pringnitz | 182/187 |
| 2007/0022696 A1 * | 2/2007 | Kim | 52/630 |
| 2007/0039779 A1 | 2/2007 | Ellingson | |
| 2007/0181365 A1 | 8/2007 | Braud | |
| 2007/0256897 A1 * | 11/2007 | Feltner | 182/187 |
| 2007/0261919 A1 * | 11/2007 | Roe | 182/187 |
| 2008/0128204 A1 * | 6/2008 | Engstrom | 182/116 |
| 2008/0149422 A1 * | 6/2008 | Lott | 182/187 |
| 2009/0183455 A1 * | 7/2009 | Polk et al. | 52/309.1 |
| 2009/0229916 A1 | 9/2009 | Berkbuegler | |
| 2010/0126803 A1 * | 5/2010 | Cama | 182/187 |
| 2010/0270105 A1 * | 10/2010 | Hovey et al. | 182/135 |
| 2011/0132686 A1 * | 6/2011 | Priest | 182/187 |
| 2011/0180351 A1 * | 7/2011 | Cama | 182/222 |
| 2012/0080267 A1 * | 4/2012 | Furseth et al. | 182/115 |
| 2012/0111666 A1 | 5/2012 | Furseth et al. | |
| 2012/0168249 A1 * | 7/2012 | Furseth et al. | 182/113 |
| 2012/0175190 A1 * | 7/2012 | Schlipf | 182/187 |
| 2012/0199418 A1 * | 8/2012 | Priest | 182/129 |

OTHER PUBLICATIONS

Big Game Treestands; Brochure "Live the Legacy"; Windom, Minnesota, United States; 2007 (46 pgs.).

Cabela's; Catalog "Archery"; Sidney, Nebraska, United States; 2006 (8 pgs.).

Office Action mailed Jan. 19, 2010 in U.S. Appl. No. 11/627,772, filed Jan. 26, 2007.

Office Action mailed Aug. 19, 2010 in U.S. Appl. No. 11/627,772, filed Jan. 26, 2007.

Office Action mailed Mar. 29, 2011 in U.S. Appl. No. 11/627,772, filed Jan. 26, 2007.

* cited by examiner

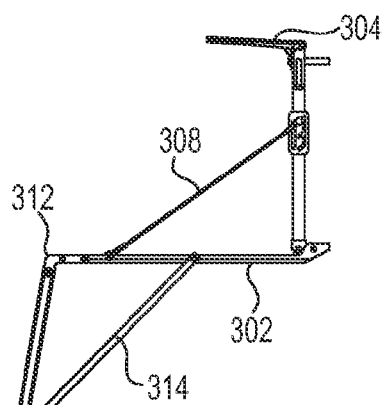
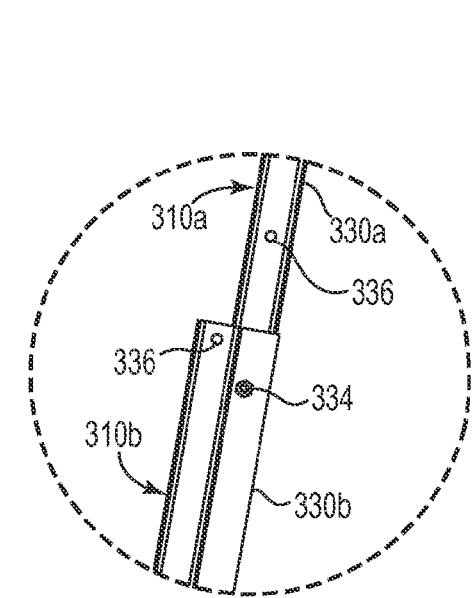
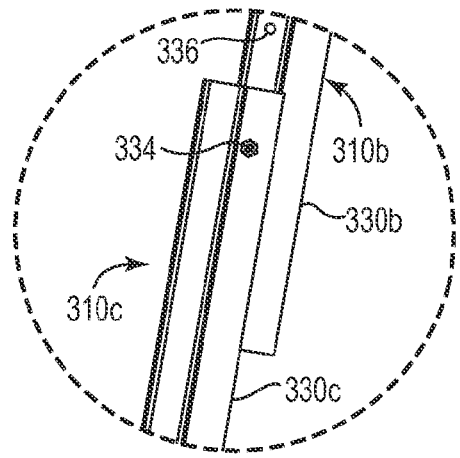
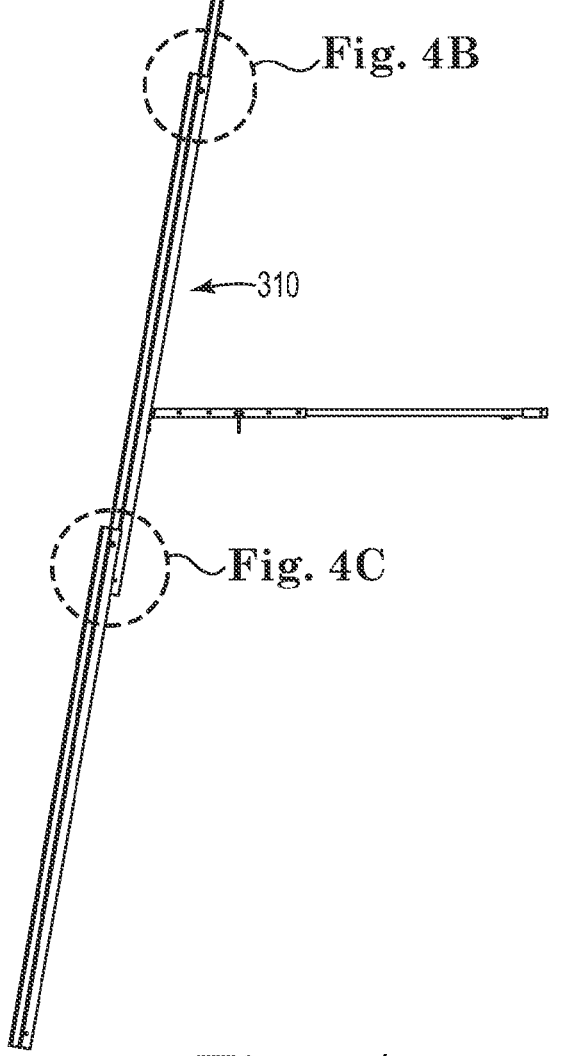
Fig. 4B
Fig. 4C
Fig. 4A

LOAD-BEARING PLATFORM

RELATED APPLICATIONS

This application is a continuation-in-part of U.S. patent application Ser. No. 13/252,876, filed Oct. 4, 2011, and entitled "TREE STAND," which claims the benefit under 35 U.S.C. §119(e) of U.S. Provisional Patent Application No. 61/389,539, filed Oct. 4, 2010, and entitled HUNTING LADDER STAND HAVING HEXAGONAL PLATFORM, both of which are hereby incorporated by reference herein in their entirety.

TECHNICAL FIELD

The present disclosure relates generally to load-bearing platforms that can be used, for example, in tree stand applications.

BACKGROUND

Hunting wild game from a position elevated above the ground provides several benefits over hunting from ground level. A hunter that is perched above the ground can be positioned above an animal's normal field of view, reducing the likelihood that the animal will spot the hunter first. The scent of the hunter is also above the prey's nose, minimizing the chance that the animal will smell the hunter before the hunter can spot the animal. Also, the hunter's range of vision may be increased and allow shots over otherwise obstructing limbs and brush.

A variety of tree stands have been developed that can elevate hunters above the ground and allow the aforementioned benefits. These tree stands may be adapted to be readily attached to a tree, post, or other vertical support member to provide a platform, seat, or combination of both at any desired level above the ground. Presently available tree stands adapted to be attached to a tree, post, or other vertical support member can be unstable and may tend to bounce, both of which can cause a user (such as a hunter) to fall from the tree stand.

SUMMARY

The present disclosure provides embodiments of tree stands for providing, for example, an elevated standing and/or sitting position. The tree stands may be configured to be secured to a tree. The tree stands may enable a user to climb a tree and/or may be accessible via a collapsible and/or stackable ladder.

The present disclosure further provides embodiments of load-bearing platforms that may be used as a platform of a tree stand.

Additional aspects and advantages will be apparent from the following detailed description of preferred embodiments, which proceeds with reference to the accompanying drawings.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which:

FIGS. 4A, 4B, and 4C illustrate a side view and detailed side views, respectively, of the tree stand shown in FIG. 3.

DETAILED DESCRIPTION OF PREFERRED EMBODIMENTS

The present disclosure provides embodiments of tree stands that are adapted to providing an elevated standing and/or sitting position. The tree stands may be configured to be secured to a tree or other upright support structure. The tree stands may enable a user to climb the tree or the other upright support structure and/or may be accessible via a collapsible and/or stackable ladder. A user may desire an elevated position for a variety of reasons. For example, a user, such as a hunter, may use the stand to obtain an elevated position from which to hunt. As another example, the tree stand may also be used for maintenance of equipment in an elevated position and/or supported by an upright and/or generally vertical support structure, such as power lines.

The tree stands of the present disclosure may also be easily portable, transitioning from an operable configuration to a transport configuration that may be more compact and easily transported. The stackable ladder of the tree stand can also be transitioned between an extended operable (extended) configuration to a transport (stacked) configuration that may be more easily transported.

The platforms of the tree stands of the present disclosure are configured to be gratings having openings or perforations that constitute a large percentage of the total area of the platform and having load-bearing properties.

The embodiments disclosed herein are described in terms of their use for hunting. As can be appreciated, the scope of the disclosure is not so limited and the embodiments described herein can be adapted for a variety of purposes and for use with a variety of upright and/or generally vertical support structures.

Figure 1:
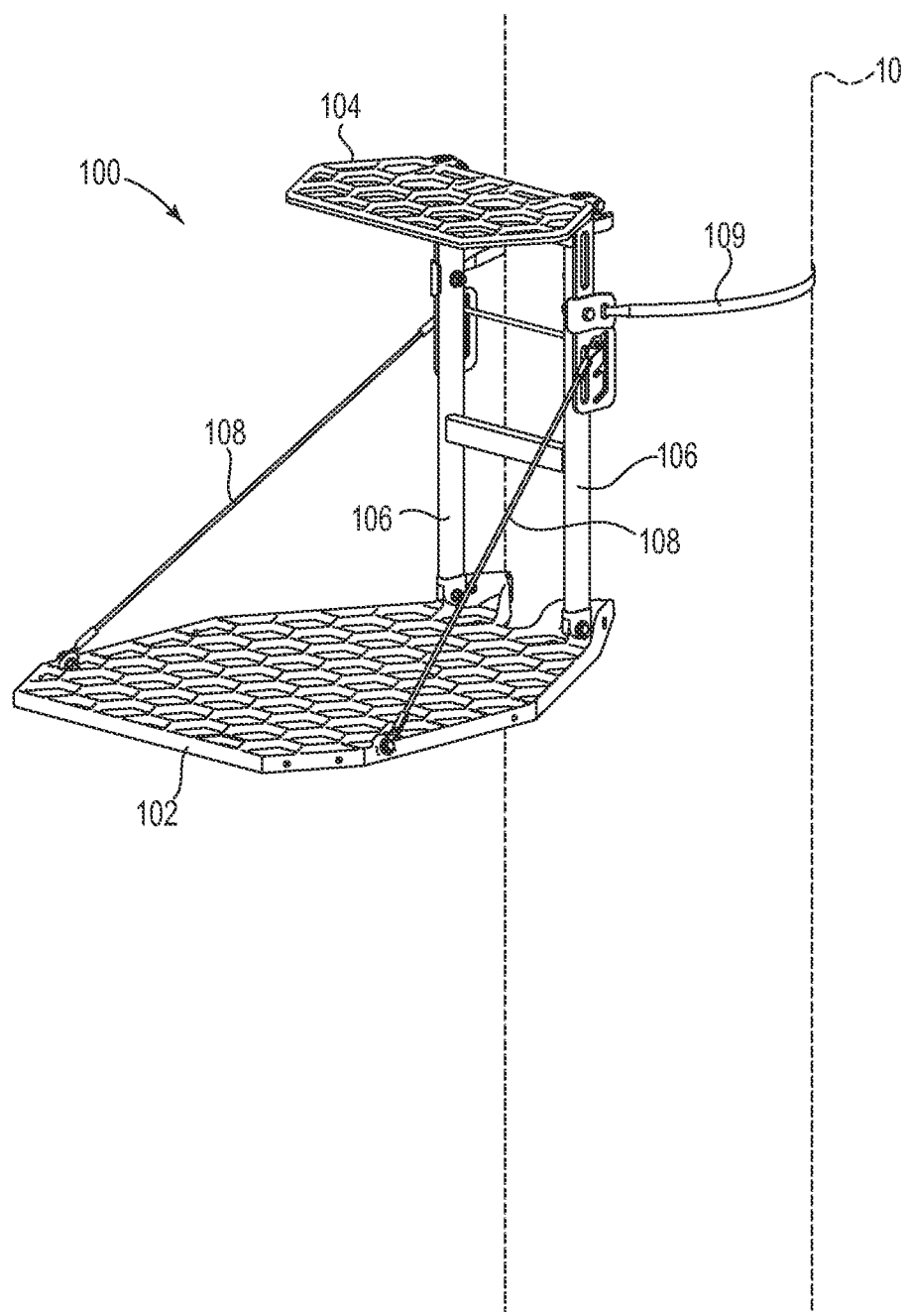
FIG. 1 illustrates a perspective view of a tree stand, according to one embodiment of the present disclosure.

FIG. 1 illustrates a perspective view of a tree stand 100, according to one embodiment of the present disclosure. The tree stand 100 may be a hang-on tree stand. The tree stand 100 may include a platform 102, a seat 104, one or more support posts 106, and one or more support cables 108. The tree stand 100 may be configured to engage a tree 10, or other generally vertical upright, substantially cylindrical structure, to provide an elevated perch from which, for example, a hunter can hunt. The platform 102 may be configured such that a hunter can stand on the platform 102. The seat 104 may be configured to be positioned above the platform 102 and may provide a place for the hunter to sit. The platform 102 and seat 104 may be coupled together by the support post(s) 106.

The platform 102 may be rotatably coupled to a first end (e.g. a bottom end) of the support post(s) 106 in such a manner that it can be rotated from a vertical position, for example, approximately 0 degrees from, or substantially parallel to, the support post(s) 106, to a horizontal position, for example, approximately 90 degrees from, or substantially perpendicular to, the support post(s) 106 and/or parallel to the ground.

Similarly, the seat 104 may be rotatably coupled to a second end (e.g. a top end) of the support post(s) 106 in such a manner that it can be rotated from a vertical position, for example, approximately 0 degrees from, or substantially parallel to or inline with, the support post(s) 106, to a horizontal position, for example, approximately 90 degrees from, or substantially perpendicular to, the support post(s) 106.

Rotation of the platform 102 and the seat 104 enables the tree stand 100 to transition between a transport configuration (with the platform 102 and seat 104 in the vertical position) and an operable configuration (with the platform 102 and seat 104 in the horizontal position). FIG. 1 depicts the tree stand 100 in the operable configuration.

The support cables 108 may extend from the support post(s) 106 at an angle and couple to the platform 102 at a point a distance outward from the support post(s) 106. The support cables 108 may provide additional support to the platform 102 and may be configured to restrict rotation of the platform 102 relative to the support post(s) 106 beyond the horizontal position (e.g., past 90 degrees from the support post(s) 106 and/or past an orientation generally parallel to the ground). The support cables 108 may be adjustable to vary the angle between the platform and the support post(s) to achieve a desired horizontal position. For example, in the illustrated embodiment, the position of the support cables 108 relative to the support post(s) 106 may be adjustable. As another example, the length of the support cables 108 may be adjustable. Thus, the support cables 108 may support the platform 102 in a generally horizontal position, parallel to the ground, when the tree stand is attached to the tree 10 or other elongate vertical support structure.

The tree stand 100 may further comprise one or more securement straps 109 to secure the tree stand 100, for example, to a tree 10 or other elongate generally vertical support structure. The one or more securement straps 109 may be secured to the support post(s) 106 and may be configured to wrap around a tree trunk or other vertical structure. The platform 102 may include a "V-shaped" tree contact point. As described in greater detail below, the platform 102 may be configured such that downward rotation of the platform 102 from the vertical position toward the horizontal position causes the support post(s) 106 to move outwardly from the tree trunk, thereby putting tension on and/or tightening the one or more securement straps 109. Tension on the one or more securement straps 109 secures the tree stand 100 against vertical movement of the tree stand 100 up or down the tree trunk. The seat 104 may also include a "V-shaped" tree contact point. The tree contact point of the seat 104 may be a notch and may include tree engaging teeth. The seat 106 may be configured such that downward rotation of the seat 104 from the vertical position toward the horizontal position causes the tree contact point of the seat 104 to engage the tree and, in turn, drive the support post(s) 106 to move outwardly from the tree trunk, thereby putting tension on and/or tightening the one or more securement straps 109.

Figure 2A:
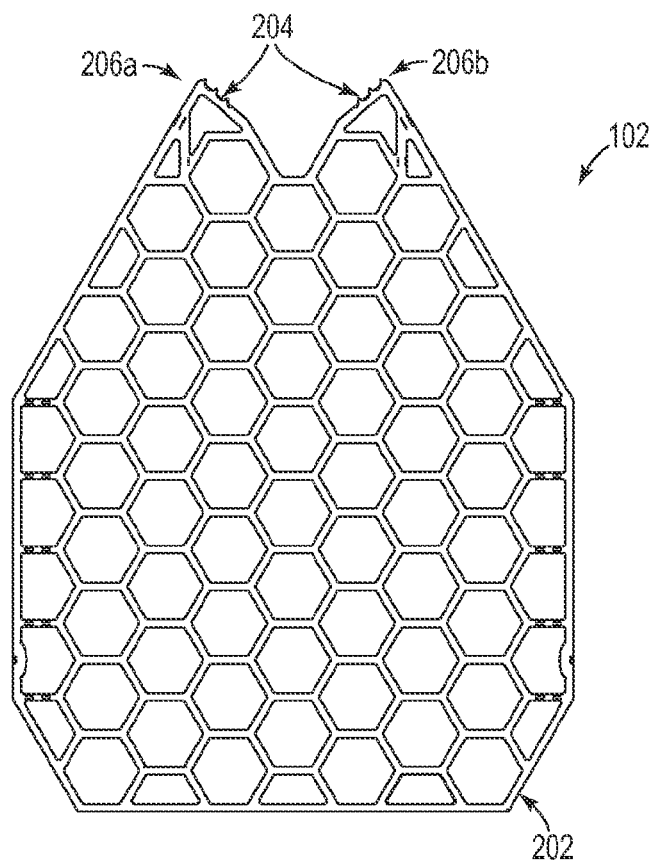
FIGS. 2A-2E illustrate various views of a platform of the tree stand shown in FIG. 1.
Figure 2B:
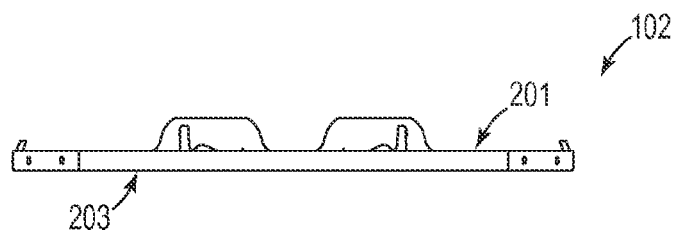
Figure 2C:
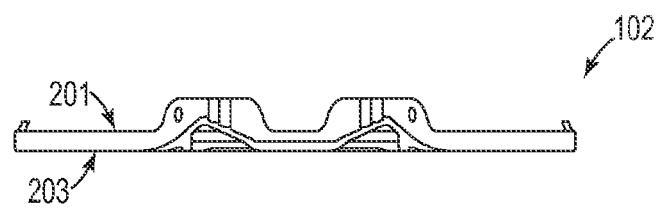
Figure 2D:
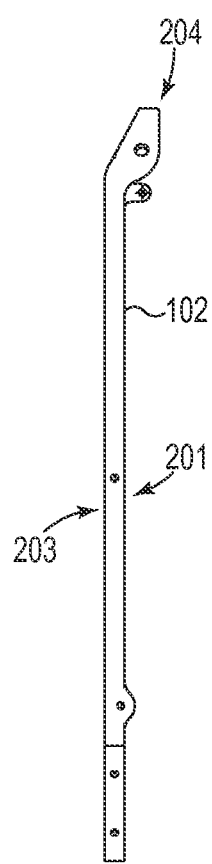
Figure 2E:
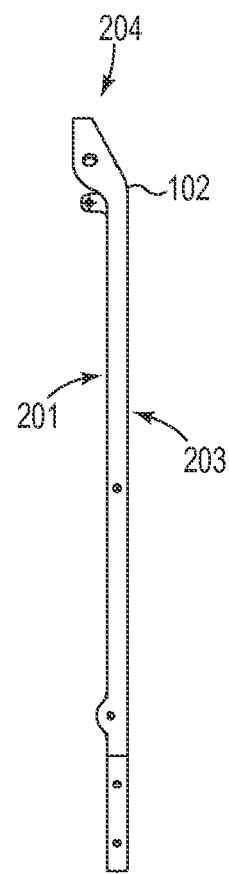

FIGS. 2A-2E illustrate various views of the platform 102 of the tree stand 100 shown in FIG. 1. FIG. 2A is a top view of the platform 102. FIG. 2B is a front end view of the platform 102. FIG. 2C is a back end view of the platform 102. FIGS. 2D and 2E are lateral side views of the platform 102. The platform 102 may be cast to form a lightweight, durable grating or similar support structure that provides a standing surface 201. As used herein, the term "grating" refers to a support structure in which openings or perforations constitute a large percentage of the total area of the support structure. For example, the platform 102 may have a "honeycomb" pattern formed of a plurality of hexagons 202, with three hexagons intersecting at a point. The hexagons 202 are formed of a plurality of ribs (e.g., bars or beams) that frame the hexagon shapes. In other words, the hexagons are the shapes of the openings or perforations of the grating. The grating of the platform 102 provides a top standing surface 201 and a bottom surface 203.

Unlike presently available platforms having gratings that are assembled, machined, welded, or cast, the platform 102 may be cast of a molten form of a material. The platform 102 may be cast of a lightweight rigid material such as a rigid plastic or a metal, such as for example aluminum. In other embodiments, the platform may be formed of any of a variety of rigid, lightweight materials, including but not limited to a composite material (e.g., carbon fiber), fiberglass, a natural material (e.g., wood). In the illustrated embodiment the platform 102 has a honeycomb pattern. In other embodiments, platform 102 may have another repeating polygon pattern, including by not limited to patterns of squares, rectangles, diamonds and any of the patterns described in U.S. Pat. No. 1,650,055.

The platform 102 may include a tree contact point 204 that is located above a plane of the platform 102. The tree contact point 204 may comprise a pair of protrusions 206a, 206b to engage the tree 10 (FIG. 1). The protrusions 206a, 206b may be positioned in a plane above a plane of a standing surface 201 of the platform 102. In other words, the tree contact point 204 may be positioned higher (more vertical) than the standing surface 201 of the platform 102 when the platform 102 is in the horizontal position in the operable configuration. The protrusions 206a, 206b may form a "V-shape" or notch to receive the surface of the tree 10. The tree contact point 204 may further include tree engaging teeth configured to engage the tree and increase frictional forces between the platform 102 and the tree 10.

The tree contact point 204 may be positioned above the standing surface 201, thereby forming an "L" shape. The "L" shape of the platform 102 may provide for greater locking force than a platform having a tree contact point essentially in the same plane as the plane of the platform. In particular, as the platform 102 is folded downward from the vertical position to the horizontal position, the point of greatest resistance to rotation, as the two protrusions 206a, 206b engage the tree 10, may generally be between about 70 degrees to about 85 degrees. Resistance to rotation may then decrease during rotation from 85 degrees to 90 degrees, which allows the platform to lock into place. The drop-off of resistance to rotation may, in effect, create an over-center locking action or mechanism that may make the platform 102 more stable and secure when in the horizontal position. Moreover, the over-center locking may stabilize the platform 102 and limit bouncing of the platform 102 as a user stands on and/or walks on the standing surface 201.

As can be appreciated the point of greatest resistance to rotation may be within another range of the rotation. For example, in another embodiment, the range within which there is the greatest resistance to rotation may be between 75 degrees and 85 degrees. In another embodiment, the range within which there is the greatest resistance to rotation may be between 65 degrees and 85 degrees. In another embodiment, the range within which there is the greatest resistance to rotation may be between 60 degrees and 85 degrees. In another embodiment, the range within which there is the greatest resistance to rotation may be between 55 degrees and 85 degrees. In another embodiment, the range within which there is the greatest resistance to rotation may be between 50 degrees and 85 degrees. In another embodiment, the range within which there is the greatest resistance to rotation may be between 50 degrees and 80 degrees. In another embodiment, the range within which there is the greatest resistance to rotation may be between 50 degrees and 75 degrees. In another embodiment, the range within which there is the greatest resistance to rotation may be between 50 degrees and 70 degrees. In another embodiment, the range within which there is the greatest resistance to rotation may be between 50 degrees and 65 degrees. In another embodiment, the range within which there is the greatest resistance to rotation may be between 50 degrees and 60 degrees. In another embodiment, any suitable point of rotation may be configured as a point of greatest resistance to rotation to create an over-center action.

Figures 3A, 3B:
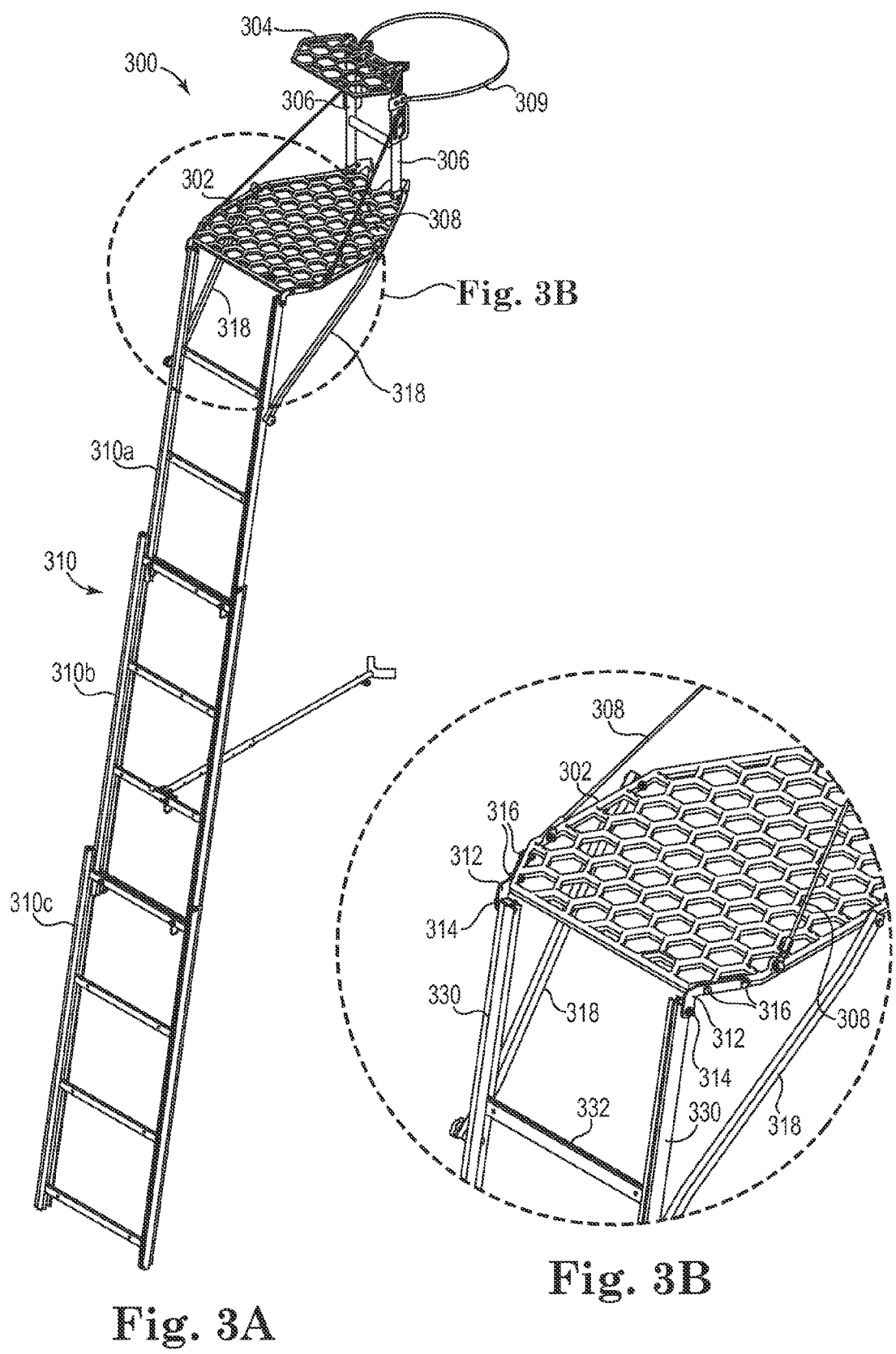
FIGS. 3A and 3B illustrate a perspective view and a detailed perspective view, respectively, of another embodiment of a tree stand, according to the present disclosure.

FIGS. 3A and 3B illustrate a perspective view and detailed perspective view, respectively, of a tree stand 300, according to another embodiment of the present disclosure. The tree stand 300 may include a platform 302, a seat 304, support posts 306, and an optional sliding stackable ladder 310. Thus, the tree stand 300 may be a ladder tree stand. The ladder 310 may be releasably attached to the platform 302, for example with "L" brackets 312 and fasteners 314. The platform 302 may also have holes for accepting fasteners 316 to secure the "L" brackets 312 to the platform 302. The ladder 310 may also be attached to the platform 302 by ladder support arms 318. The platform 318 may include holes for attaching the ladder support arms 318. The ladder 310 may include a plurality of ladder segments 310a, 310b, 310c. Each of the ladder segments 310a, 310b, 310c may include a pair of rails 330a, 330b, 330c (collectively 330) connected by a plurality of rungs 332.

FIGS. 4A, 4B, and 4C illustrate a side view and detailed side views, respectively, of the tree stand 300 shown in FIG. 3A. The ladder segments 310a, 310b, 310c of the sliding stackable ladder 310 may be locked into place relative to each other using spring pins 334 and holes 336 in the ladder rails 330. Multiple holes 336 or stops may be provided so that a height/length of the ladder 310 (and a height of the tree stand 300) can be adjusted. The rails 330b of the second ladder segment 310b may be configured to receive the rails 330a of the first ladder segment 310a. In other words, the rails 330a of the first ladder segment 310a slide into the rails 330b of the second ladder segment 310b (or otherwise transition to a stacked configuration with respect to the second ladder segment 310b). Similarly, the rails 330c of the third ladder segment 310c are configured to receive at least a portion of the rails 330b of the second ladder segment 310b. In other words, a portion of the rails 330b of the second ladder segment 310b may slide into the rails 330c of the third ladder segment 310c (or otherwise transition to a stacked configuration with respect to the third ladder segment 310b). Accordingly, the height (or length) of the ladder 310 can be adjusted and/or transitioned from an extended (operable) configuration (as shown in FIGS. 3 and 4) to a stacked (transport) configuration. In the illustrated embodiment, the ladder 310 may be uncoupled from the platform 302 during transport.

Figure 5A:
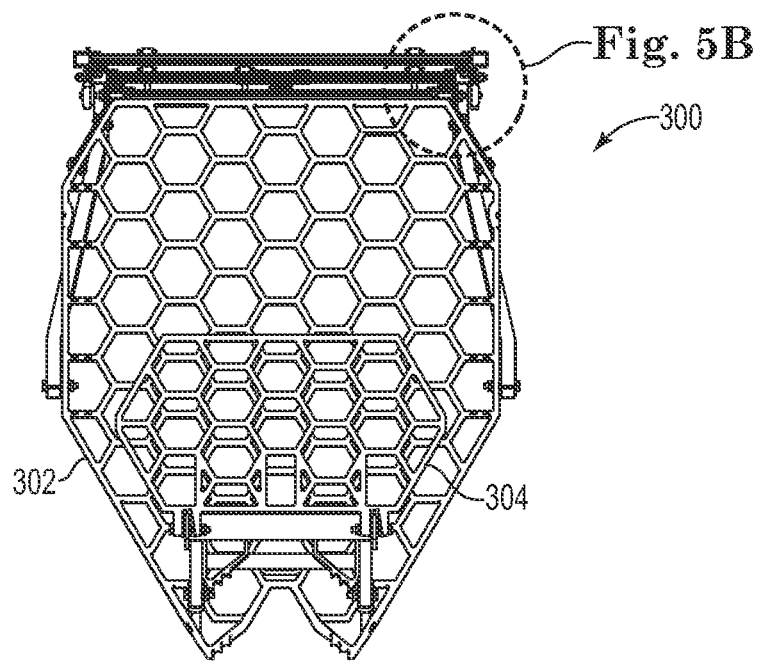
FIGS. 5A and 5B illustrate a top view and a detailed top view, respectively, of the tree stand of FIG. 3.
Figure 5B:
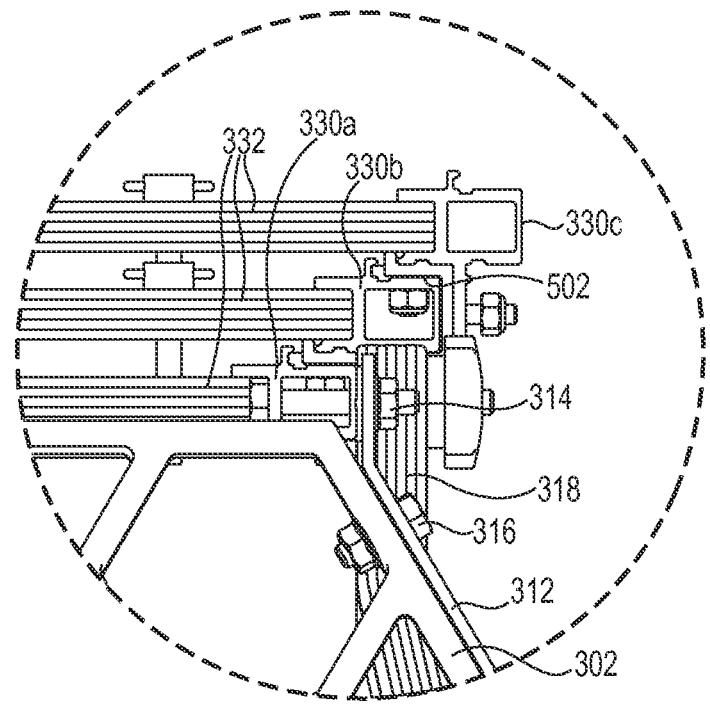

FIGS. 5A and 5B illustrate a top view and detailed top view, respectively, of the tree stand shown in FIG. 3A in the operable configuration. The illustrated view is looking down the stackable ladder 310 rather than directly perpendicular to the generally horizontal seat 304 and platform 302. The seat 304 is positioned over and a distance above the platform 302. The ladder rails 330 of, for example, the second ladder segment 310b and the third ladder segment 310c may include channels 502 to receive at least a portion of the rails of the first ladder segment 310a or second ladder segment 310b, respectively, to transition to the "stacked" or transport configuration, on top of one another and/or within one another, thereby decreasing the length of the ladder 310. A protruding portion of ladder rails 310a and 310b may be configured to fit into the channels 502. This nested or telescoping feature may also allow the ladder segments 310a, 310b, 310c to be progressively narrower. The ladder channels 502 can be separated by spacers, preferably made of plastic. The plastic spacers also may reduce the noise of the tree stand 300, may make sliding the ladder segments 310a, 310b, 310c easier, and may increase stability of the ladder 310 when it is the extended operable configuration.

Figure 6:
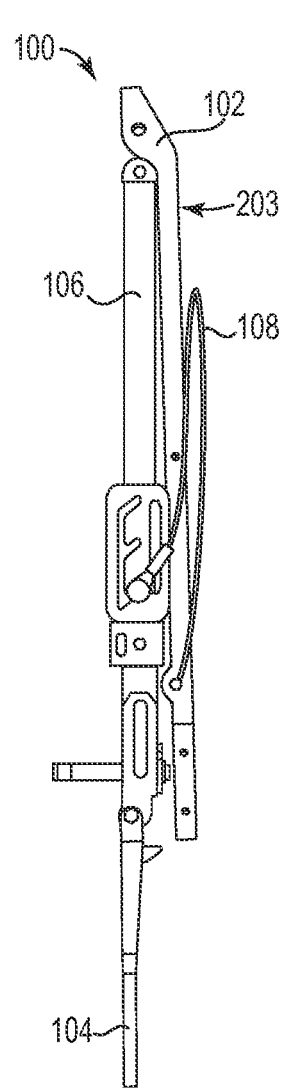
FIG. 6 illustrates a tree stand in a transport configuration, according to one embodiment of the present disclosure.

FIG. 6 illustrates the tree stand 100 of FIG. 1 in the transport configuration, according to one embodiment of the present disclosure. As illustrated, in the transport configuration, the platform 102 is rotated to a substantially vertical position, approximately 0 degrees relative to the support post(s) 106. In another embodiment, the an angle between the support post(s) 106 and the platform 102 is less than approximately 15 degrees. Similarly, the seat 104 is rotated to a substantially vertical position, approximately 0 degrees relative to, or in line with, the support posts 106. In another embodiment, the an angle between the support post(s) 106 and the seat 104 is less than approximately 15 degrees. With the tree stand 100 in the transport configuration, a hunter can attach carry straps (not shown) to the bottom surface 203 of the platform 102 for carrying the tree stand 100 similar to a backpack.

Figure 7:
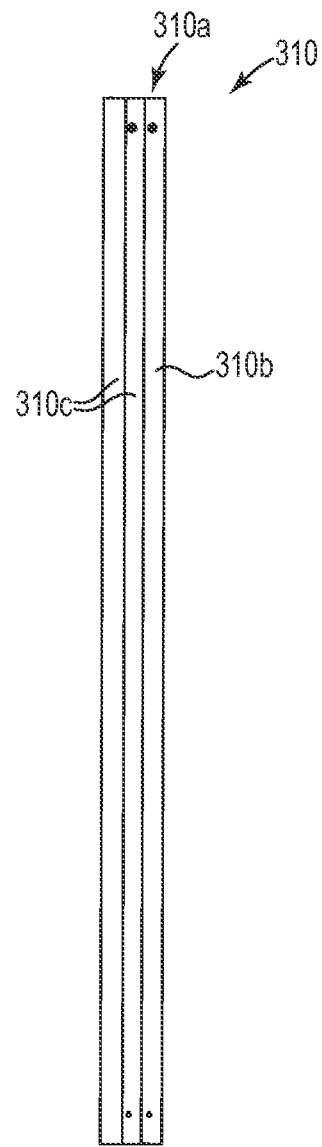
FIG. 7 illustrates a stackable ladder in a stacked configuration, according to one embodiment of the present disclosure.

FIG. 7 illustrates the ladder 310 of FIG. 3 in the stacked configuration, according to one embodiment of the present disclosure. As shown, the ladder segments 310a, 310b, 310c are stacked and/or received into one another, thereby reducing the length of the ladder 310.

Figure 8A:
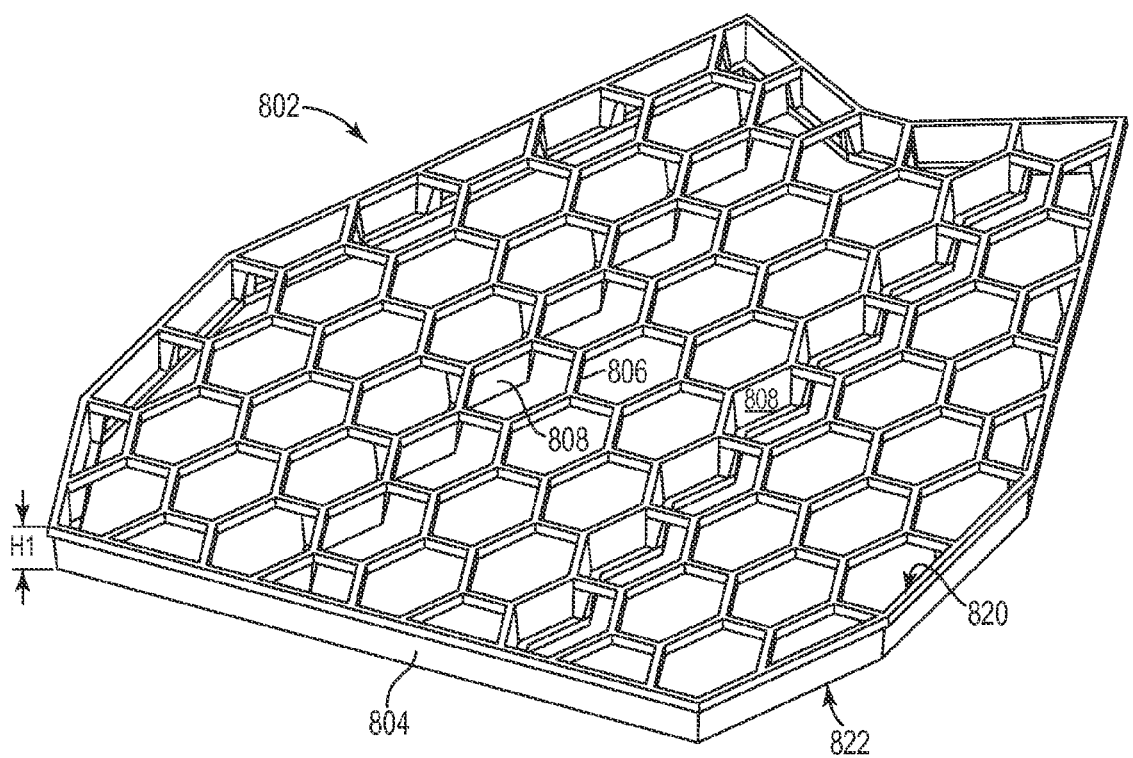
FIGS. 8A, 8B, 8C, 8D, 8E and 8F illustrate various views of a platform of a tree stand, according to another embodiment.
Figure 8B:
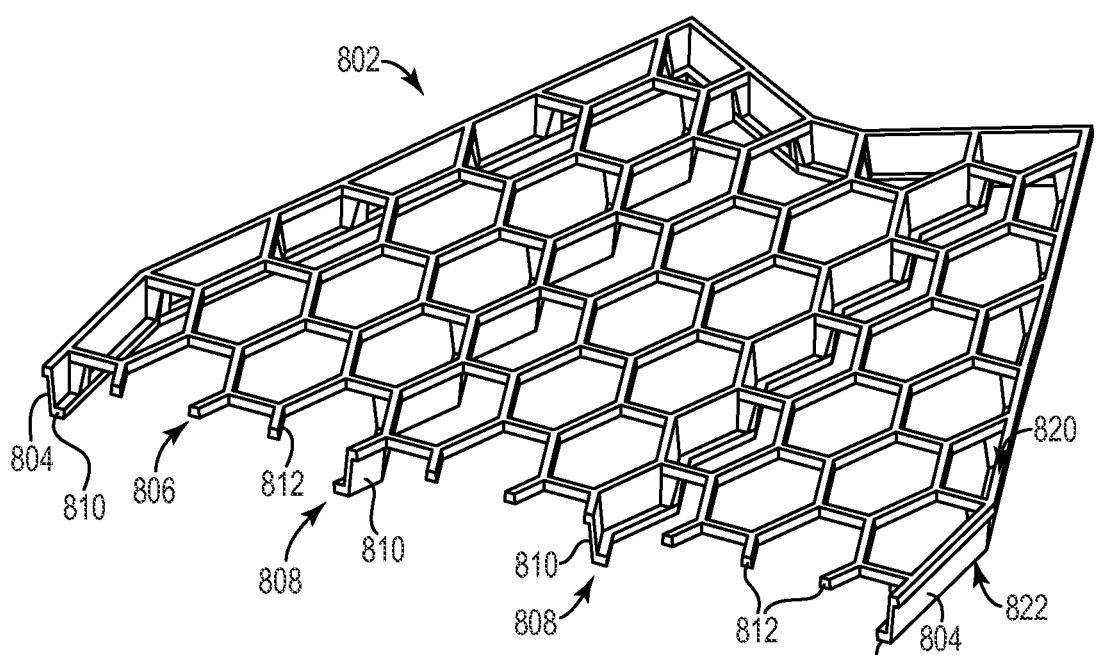
Figure 8C:
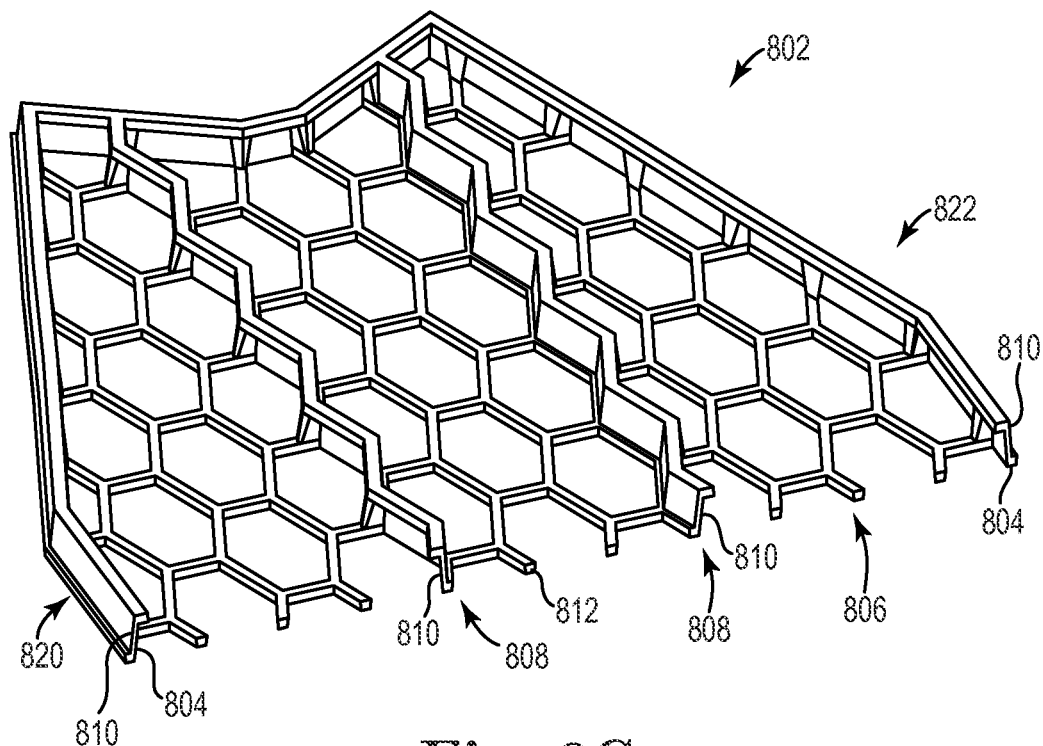
Figure 8D:
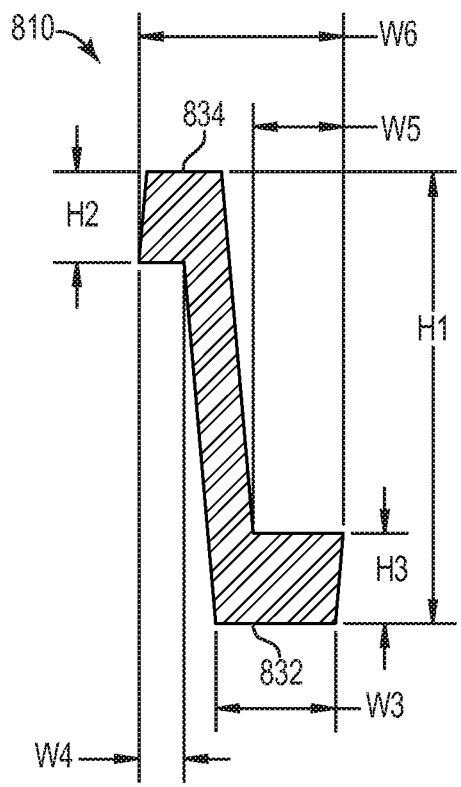
Figure 8E:
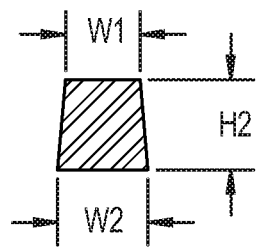
Figure 8F:
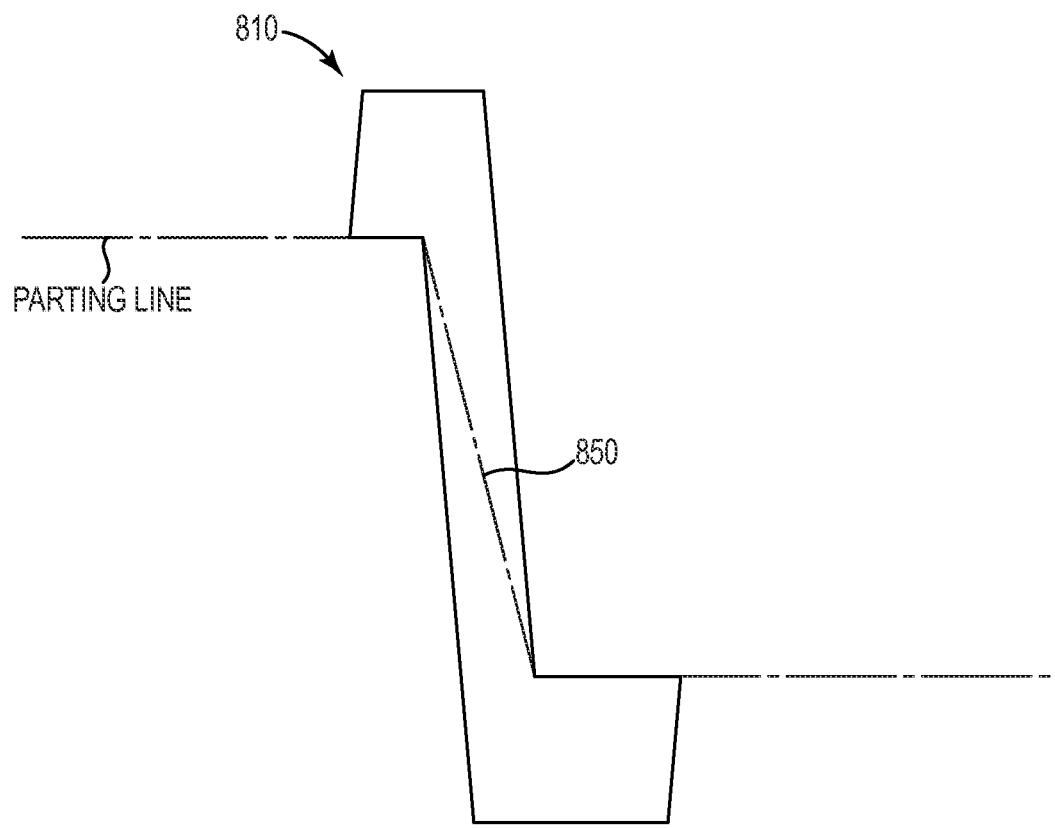

FIGS. 8A, 8B, 8C, 8D, and 8E illustrate various views of a platform 802 of a tree stand, according to another embodiment. Specifically, FIG. 8A illustrates a perspective view of the platform 802. FIG. 8B illustrates a cut-away top view of the platform 802. FIG. 8C illustrates a cut-away bottom view of the platform 802. FIG. 8D illustrates a cross-sectional area of a structural rib 810 of the grating of platform 802. FIG. 8E illustrates a cross-sectional area of a surface rib 812 of the grating of the platform 802. FIG. 8F illustrates a cross-sectional area of a structural rib 810 showing the parting line for a mold for casting the structural rib 810.

Referring collectively and generally to FIGS. 8A, 8B, and 8C, the platform 802 may be cast to form a lightweight, durable grating or similar support structure that provides a standing surface 820. For example, the platform 802 may have a "honeycomb" pattern formed of a plurality of hexagons, with three hexagons intersecting at a point. The hexagons are formed of a plurality of ribs (e.g., bars or beams) 806, 808 that frame the hexagon shapes. In other words, the hexagons are the shapes of the openings or perforations of the grating. The grating of the platform 802 provides a top standing surface 820 and a bottom surface 822. Unlike presently available platforms having gratings that are assembled, machined, welded, or forged, the platform 802 may be formed by casting, for example, using a molten form of a lightweight rigid material such as a rigid plastic or a metal, such as for example aluminum.

The platform 802 may be designed with a cross-sectional configuration that may be formed of approximately one-third less material than the material used to form a similar sized traditional platform having a traditional cross-sectional configuration, yet may provide similar load bearing properties as such traditional platform. In particular, the platform 802 may include a perimeter wall 804 and a surface portion 806. The platform 802 may also include reinforcement walls 808. The perimeter wall 804, the surface portion 806, and/or the reinforcement walls 808 may be formed of a plurality of ribs of at least two types, including structural ribs 810 and surface ribs 812. Each of these types of ribs 810, 812 has a different cross section, as shown in FIGS. 8D and 8E, and are is formed of a different amount of material per unit of rib than the other type. The different cross sections may enable less material to be used in casting the platform than traditional platforms, while still maintaining equivalent load-bearing properties. Specifically, the surface portion 806 can be constructed using less material while being able to support a load over the total area of the platform. The interconnections of the ribs 810, 812 are formed integrally by casting rather than by other methods such as welding, forging, machining, etc.

The perimeter wall 804 defines the boundary of the platform 802, including a total area of the platform 802. The perimeter wall 804 also may define the thickness or height $h_1$ of the platform 802. In the illustrated embodiment, the height $h_1$ may be 1.25 inches. The perimeter wall 804 is formed of structural ribs 810. A cross section of structural rib 810 that may be used to form a perimeter wall 804 is illustrated in FIG. 8D and described below with reference to the same.

The surface portion 806 of the platform 802 is enclosed within the perimeter wall 804. The top or standing surface 820 of surface portion 806 may be coplanar with a top surface of perimeter wall 804. By contrast, the bottom surface 822 of the surface portion 806 is in a different plane than a bottom surface of the perimeter wall 804. The height $h_2$ of the surface portion 806 is less than the height $h_1$ of the outer perimeter 804. In the illustrated embodiment, the height $h_2$ may be 0.25 inches.

In the illustrated embodiment the surface portion 806 is formed in a honeycomb pattern. In other embodiments, the surface portion 806 may include another repeating polygon pattern, including but not limited to patterns of squares, rectangles, diamonds, triangles, and any of the patterns disclosed in U.S. Pat. No. 1,650,055. A cross section of a surface rib 812 of the surface portion 806 is illustrated in FIG. 8E and described below with reference to the same.

The platform 802 may also include interior reinforcement walls 808. Interior reinforcement walls 808 may extend downward below the surface portion 806 and follow a path defined by, for example, a pattern of the surface portion 806. In the illustrated embodiment, there are two interior reinforcement walls 808 equally spaced in the transverse axis of the platform 802 that follow a longitudinal path. In other embodiments, any number of interior reinforcement walls 808 that follow any path defined by upper surface portion 806 can be included in the platform 802. For example, multiple reinforcement walls 808 could follow along paths that form a "Y" shape.

In the illustrated embodiment, the cross section of the perimeter wall 804 and the combination of the cross section of the interior reinforcement walls 808 and the surface portion 806 may be the same sized "Z" shaped cross section shown below in FIG. 8D. The interior reinforcement walls 808 provide a support structure that allows the surface portion 806 to be constructed using less material while being able to support a load over a given area defined by the perimeter wall 804. As can be appreciated, in other embodiments, reinforcement wall 808 could have a different cross section than the perimeter walls 804.

FIG. 8D illustrates a cross section of a structural rib 810, and therefore of the perimeter walls 804 and/or the reinforcement walls 808 of the platform 802. As illustrated, the cross section of a structural rib 810 may include a vertical segment and upper and lower horizontal segments configured in the shape of a "Z." As shown, the horizontal segments may be shaped to have a trapezoidal cross section. The vertical segment may be slightly angled, but substantially vertical, extending between the upper horizontal segment and the lower horizontal segment. For example, the vertical segment may be oriented at an angle between 90 degrees and 115 degrees relative to the horizontal segments. The structural ribs 810 having the "Z" shaped cross sections may provide similar strength characteristics and load-bearing properties as ribs having substantially rectangular cross sections, while using less material. In the illustrated embodiment, the platform 802 may be constructed of cast aluminum and have a surface area of approximately 521 square inches while having a mass of approximately 5.3 lbs. Further, the open area (e.g., openings and/or protrusions of the grating) of the platform 802 may be 83.5% of the total area of the platform 802.

As illustrated in FIG. 8D, an inverted trapezoid 832 that may form the lower portion of the "Z" shaped cross section has a larger area than a trapezoid 834 forming the upper portion of the "Z" shaped cross section. The lower trapezoid 832 may have an area that is approximately 1.5 times the area of the upper trapezoid 834. By having more material in the lower trapezoid 834 of the "Z" shaped cross section, less material can be used in the upper trapezoid of the "Z" shaped cross section while maintaining a neutral plane that is at or above the vertical center of the "Z" shaped cross section.

In one embodiment, the dimensions of the "Z" shaped cross section shown in FIG. 8D may be as follows: $h_1$=1.25"; $h_2$=0.25"; $h_3$=0.25"; $w_1$=0.21"; $w_2$=0.25"; $w_3$=0.33"; $w_4$=0.125"; $w_5$=0.25"; $w_6$=0.57."

FIG. 8E illustrates a cross section of a surface rib 812 of the platform 802. As illustrated, the cross section of the surface rib 812 of the surface portion 806 is a trapezoidal shape and is the same as the upper trapezoid 834 of the "Z" shaped cross section shown in FIG. 8D. As is evident, the amount of material to form a surface rib 812 of the platform 802 is considerably less than the amount of material to form a structural rib 810, which may results in an overall reduction in the amount of material needed to cast the platform 802 as compared to traditional platforms.

FIG. 8F illustrates a cross-sectional area of a structural rib 810, showing the parting line 850 for the mold for casting the structural rib 810. The cross sectional configuration of the platform 802 allows the platform 802 to be manufactured using a two piece mold. Such a two-piece mold may include an offset (or jogged) parting line 850. An offset parting line results when an upper mold and a lower mold meet at multiple horizontal planes. FIG. 8F illustrates an offset parting line 850 of a top mold and bottom mold used to form the structural rib 810 having a "Z" shaped cross section.

A method of casting the platform 802, according to one embodiment, may include, for example, obtaining a top mold and a bottom mold having an offset parting line and configured to be used to integrally cast a perimeter wall 804, a surface portion 806, and a reinforcement wall 808. In particular, the top mold and bottom mold may be configured to cast a perimeter wall and/or a reinforcement wall having a "Z" shaped cross section. The top mold and bottom mold may be stacked together, with the offset parting line, to form a cavity. A molten material, such as metal, may be injected into the cavity. The metal cools and the molds can be pulled apart leaving the cast platform 802. When the molds are pulled apart, the top mold may be pulled upward and the bottom mold may be pulled downward, leaving the cast platform 802.

As can be appreciated, a grating type platform, such as for example the platform 102 and the platform 802, is desirable in tree stand applications because of the relatively low amount of material used to create the platform as opposed to a platform having a solid surface. A platform having grating can be light weight and more easily transportable than other platforms. While the disclosed platforms are useful in tree stand applications, a person of ordinary skill appreciates that these platform can be used in other applications, such grating articles and floor tiling.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. The upper and lower limits of these smaller ranges, which may independently be included in the smaller ranges, is also encompassed within the disclosure, subject to any specifically excluded limit in the stated range. Where the stated range includes one or both of the limits, ranges excluding either both of those included limits are also included in the disclosure.

Unless defined otherwise, all technical and scientific terms used herein have the same meaning as commonly understood by one of ordinary skill in the art to which this disclosure belong. Although any methods and materials similar or equivalent to those described herein can also be used in the practice or testing of the disclosure, the preferred methods and materials are now described. All patents and publications mentioned herein, including those cited in the Background of the application, are hereby incorporated by reference to disclose and described the methods and/or materials in connection with which the publications are cited.

The publications discussed herein are provided solely for their disclosure prior to the filing date of the present application. Nothing herein is to be construed as an admission that the present disclosure are not entitled to antedate such publication by virtue of prior invention. Further, the dates of publication provided may be different from the actual publication dates which may need to be independently confirmed.

Other embodiments of the present disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above.

As can be appreciated, the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto.

The invention claimed is:

1. A load bearing platform for a tree stand configured to attach to a tree or other elongated structure to support a user at an elevated position, the load bearing platform comprising:
   a perimeter wall comprising a perimeter boundary and area of the load bearing platform, wherein the perimeter wall is a perimeter wall comprising a perimeter boundary defining an area of the load bearing platform, wherein the perimeter wall is formed by structural ribs, wherein each of the structural ribs of the perimeter wall comprises an upper horizontal segment connected to a lower horizontal segment by a vertical segment, wherein each of the structural ribs have a first height extending from a bottom surface of the lower horizontal segment to a top surface of the upper horizontal segment;
   a surface portion spanning the area defined by the perimeter wall and formed of surface ribs arranged in a repeating pattern of polygons, wherein the surface portion is integrally interconnected within an interior surface of the perimeter wall, wherein the surface ribs that form the surface portion have a second height that is less than the first height, and wherein a bottom-most surface of the surface ribs is in a different plane than the bottom surface of each of the structural ribs of the perimeter wall, the second height extending from the bottom-most surface of the surface ribs to a top surface of the surface ribs, wherein each of the top surfaces are coplanar with each other;
   at least one reinforcement wall formed by a structural rib, wherein the at least one reinforcement wall extends from a first interior point on the perimeter wall following a path of the surface ribs of the surface portion and terminates at a second interior point on the perimeter wall, wherein each structural rib of each reinforcement wall comprises an upper horizontal segment connected to a lower horizontal segment by a vertical segment, wherein each of the structural ribs of the load bearing platform respectively comprises a transverse cross section that is substantially "Z" shaped and the upper horizontal segments and the lower horizontal segments comprise widths greater than a thickness of the vertical segments;
   wherein the perimeter wall, the surface portion, and the at least one reinforcement wall are integrally cast as a self-supporting, unitary structure configured to support the user.

2. The load bearing platform of claim 1, wherein the repeating pattern of the surface portion is a honeycomb pattern.

3. The load bearing platform of claim 1, wherein the surface ribs of the surface portion have a cross sectional area defined by an upper horizontal segment of the substantially "Z" shaped cross section of the structural rib of the at least one reinforcement wall.

4. The load bearing platform of claim 1, wherein a lower horizontal segment of the substantially "Z" shaped cross sections has a larger area than an upper horizontal segment of the substantially "Z" shaped cross sections.

5. The load bearing platform of claim 1, wherein an upper horizontal segment of the structural ribs has a trapezoidal cross section.

6. The load bearing platform of claim 5, wherein the structural ribs further comprise a lower horizontal segment having a trapezoidal cross section.

7. The load bearing platform of claim 1, wherein the structural ribs of the perimeter wall and the at least one reinforcement wall have a transverse cross section comprising an offset parting line.

8. The load bearing platform of claim 7, wherein the offset parting line intersects at vertical segments of the structural ribs for the perimeter wall and the at least one reinforcement wall.

9. The load bearing platform of claim 1, wherein a cross section of the structural ribs of the perimeter wall is the same as a cross section of the structural rib of the at least one reinforcement wall.

10. The load bearing platform of claim 1, wherein the perimeter wall defines a height of the load bearing platform.

11. The load bearing platform of claim 1, wherein the structural rib of the at least one reinforcement wall has a third height that is greater than the second height of the surface ribs of the surface portion.

12. The load bearing platform of claim 1, wherein the at least one reinforcement wall is a plurality of reinforcement walls.

13. A tree stand comprising the load bearing platform of claim 1.

14. The load bearing platform of claim 1, wherein the load bearing platform consists essentially of the perimeter wall, the surface portion, and the at least one reinforcement wall.

15. A method
of casting the load bearing platform of claim 1, the method comprising the steps of:
obtaining a casting mold to cast the load bearing platform, the casting mold having a top mold and a bottom mold that meet with an offset parting line, the casting mold configured to cast the structural ribs of the perimeter wall, the casting mold further configured to cast the surface ribs of the surface portion that span the area defined by the boundary formed by the perimeter wall;
stacking the top mold and the bottom mold together to meet at the offset parting line and to form a cavity;
injecting a molten material into the cavity;
allowing the molten material to cool; and
separating the top and bottom molds of the casting mold and removing the load bearing platform from the casting mold.

* * * * *